United States Patent Office 3,197,323
Patented July 27, 1965

3,197,323
ADMIXTURE FOR CEMENTITIOUS GROUTS AND METHOD OF MAKING SAME
Solomon J. Rehmar, East Cleveland, Ohio, assignor to Intrusion-Prepakt, Inc., Cleveland, Ohio, a corporation of Ohio
No Drawing. Filed Feb. 20, 1961, Ser. No. 90,176
7 Claims. (Cl. 106—314)

This invention pertains to the art of admixtures for cementitious grouts and more particularly to improvements in the method of manufacture and in the ingredients thereof.

United States Patent No. 2,434,302, assigned to the assignee of this application, describes an admixture for cementitious grouts or slurries which are to be pumped long distances through pipes to the point of end use, usually voids in the earth. The admixture described consisted essentially of a suspending agent, a lubricant, and a small amount of aluminum in the form of powder or flakes. The suspending agent functions to hold the minute particles of cement and sand in suspension in the slurry, preventing them from settling out as the slurry is pumped over long distances. The lubricant also serves to help suspend the particles and further assists the particles in moving through minute cracks and crevices in the earth so that they will not be filtered out by such cracks and will fill the voids there beyond and ultimately harden.

The aluminum is provided for the purpose of reacting with the slurry and slowly producing a gas, which gas exerts an aerating effect on the slurry and later an expanding force on the hardening cement to prevent contraction shrinkage as it hardens. This is particularly important where the slurry has been pumped into a closed fixed volume cavity such as a void in the earth.

Even if the slurry fills the void when soft, in the absence of the aluminum, it shrinks from the walls of the cavity as it hardens and leaves hairline cracks or voids.

Usually the various ingredients of the admixture are blended together in the dry form by mechanical mixers then placed in bags awaiting shipment to the job site where the admixture will be mixed with Portland cement, water, and any other ingredients of the slurry, such as sand, fly ash, or the like.

One of the problems with aluminum containing admixtures has been a relatively poor shelf life. That is to say the ability of the aluminum to function and produce gases when mixed with the other ingredients of the slurry decreased rapidly with time after the dry blending of the admixture. Analysis of the problem indicated that the aluminum which was purchased in the commercially known form as polished flakes, had been produced by a peening process in the presence of an oil. Thus, each flake consisted of pure aluminum with a light oil film on the surface, which oil film served as a protective layer to prevent the oxygen of the air from coming into contact with the pure aluminum and forming an aluminum oxide coating on the surface of the aluminum which, as is known, is generally an insoluble and impervious film preventing further reaction of the aluminum, either with the oxygen of the air or with other ingredients with which the flakes might come in contact.

It further appeared that the process of dry blending the aluminum flakes with the other ingredients of the admixture produced an abrasive action on the aluminum flakes and removed this oil film. The admixture, if used immediately after this blending operation, performed very well because the pure aluminum of these flakes was exposed and was ready to react with the alkalis in the cementitious slurry. However, if the admixture was not used immediately, the oxygen of the atmosphere came into contact with the aluminum flakes in the admixture and slowly formed an oxide film on the surface of the aluminum flakes. Thus, after a relatively short period of time, the aluminum flakes again had a protective film which would prevent or impede the ability of the alkali solution to readily react with the aluminum.

This problem was taken care of heretofore by only producing such quantities of admixture as were immediately needed or by carefully balancing the surface area to volume ratio of the aluminum flakes such that the minimum surface area was presented to the abrasive action of the blending and yet a sufficient surface area was present that the reaction with the alkalis in the cementitious slurries could readily take place.

The present invention contemplates so protecting the aluminum prior to its addition to the admixture to overcome all of the above referred to difficulties and others and enables the production of an admixture which has a maximum shelf life while at the same time having good gas producing characteristics when mixed with a cementitious slurry.

In accordance with the present invention, aluminum powder is employed as heretofore, but instead of being added to the other ingredients of the admixture as a powder, is added in the form of dried, porous granules made up of a mixture of the aluminum powder and a binder consisting of a water soluble material which is non-reactive with aluminum.

In accordance with a further aspect of the invention, the granules also contain a powdered extender made of a material which is also non-reactive with aluminum. This extender serves the purpose of providing porosity in the granules and prevents the binder material from forming too impervious a coating around each aluminum flake.

Further in accordance with the invention, a method of processing aluminum for use in admixtures for cementitious slurries is provided comprised of the steps of providing powdered aluminum, mixing such aluminum with a powdered extender and a water soluble coating material, both of which are inert to aluminum and enough of a solvent for such material to produce a paste, breaking the paste into granules and drying same.

The aluminum powder employed in accordance with the invention is of a type wherein the individual particles of the aluminum have been continuously protected from the oxygen of the atmosphere from the time of manufacture, such that no aluminum oxide film has formed thereon. Thus, the particles may be of the type known as polished flakes which have been produced by a peening operation in the presence of oil such that each flake has a light oil film on the surface to prevent the oxygen of the atmosphere from coming into contact with the pure aluminum and forming aluminum oxide therewith. The size of each particle may be as desired, taking into consideration that if the particles are too large, then the reaction time with the cementitious slurry will be too slow and the proper expanding action will not result. If the particle sizes are too small, the expanding action will take place too rapidly. Standard 100 mesh varnish leafing powder, such as that produced by the Aluminum Company of America, catalogue No. 322, has proven quite satisfactory.

The coating material must have the characteristic of being both inert to aluminum and being readily and quickly soluble in water. While a number of such coating materials may be employed, I have found that the water soluble, organic gums are quite satisfactory. Thus, those forms of methyl cellulose, salts of carboxy methyl cellulose, polymers of ethylene oxide, carboxy vinyl polymers, polyethylene glycol, hydroxy ethyl cellulose and other similar materials which are readily water soluble are particularly adaptable to carrying out the present invention. Methyl cellulose is preferred and also when dissolved in the slurry, acts as a lubricant.

The powdered extender appears to serve as a dispersant for the aluminum particles, preventing the coating material from forming too firm or solid a film around the particles of aluminum. Too solid a film prevents the material of the ultimate slurry from getting to the particles and reacting therewith.

The powdered extender must have the characteristic of being inert in the presence of aluminum. Extenders usable in accordance with the present invention are limestone, dried clay, kaolin, bentonite, coal dust and the like. Limestone dust is the cheapest and is preferred for this reason.

The above-mentioned coating materials are normally supplied as solids and in order for the coating material to properly coat the particles of aluminum and the extender, they must first be dissolved. Any known solvent which is inert to the aluminum and which will dissolve the coating material employed may be used in accordance with the invention. Thus, the solvent may be formamide which is the only organic solvent known to me at the present time which will dissolve the above-mentioned coating materials. Water may also be employed if the mixing time is held to a minimum so that the oil film on the aluminum particles is not sufficiently abraded away that the water can penetrate to the aluminum itself and react therewith.

Enough of this solvent is added to the mix so that a thick paste will be formed and this paste is then broken into small pellets or granules and the pellets or granules baked to drive off the liquid solvent leaving the pellets or granules in the dry form. The driving off of the solvent leaves a somewhat porous granule. The resultant granules should not be larger than about 8 mesh.

If formamide is used as the solvent, normally means will be provided for recovering the same as it is evaporated from the pellets.

Thus, in accordance with the invention, aluminum powder, a powdered extender, a water soluble coating material which is inert to aluminum, and a solvent for the coating material which is also inert to aluminum, are mixed to a paste, broken into granules, and dried and thereafter the resultant granules are mixed with the other materials of the admixture, e.g., lubricants, suspending agents, fly ash, Portland cement and/or sand so as to yield the final product. This final product may then be bagged ready for use and may be stored for indefinite periods of time without loss of the gas producing properties.

The amount of coating material and extender employed may vary within relatively wide limits. The prime requirement is that the ratio of coating material to the sum of the aluminum powder plus the powdered extender must be sufficiently great to provide enough cohesion within the granules so as to resist disintegration thereof during the dry mixing of the granules with the other ingredients of the admixture. On the other hand, too great a ratio of coating material to the combined aluminum power plus the extender powder, will produce a non-porous granule and thus retard the penetration of the alkaline liquids of the cementitious grout into the granule and thus prevent contact of the aluminum flakes with this alkaline solution.

By correctly proportioning the various ingredients, it is possible to produce granules or pellets which resist disintegration during the dry mixing of the admixture and yet are porous enough to absorb the alkali solution during the grout mixing. It is to be noted that once the alkali solution has been absorbed into the granule or pellet, the reaction of this solution on the aluminum flakes produces a gas, which gas then expands and assists in breaking up the granular pellets so as to then expose a maximum aluminum surface to the action of the alkali solution in the grout mixture.

A preferred mix for the present invention is as follows:

45 lbs. aluminum flakes of the standard varnish leafing powder, 100 mesh
398 lbs. limestone dust, 100 mesh
10.8 lbs. methyl cellulose (25 centipoises for a 2% solution in water)

This mixture is dry blended in a standard paddle mixer until uniformly dispersed, e.g., one to two minutes. It is to be noted that this dry blending should not continue too long as the abrasion tends to remove the oil film from the aluminum flakes. Thereafter enough water, e.g., 190 lbs., is added to form a thick paste. This paste is then rolled out into small pellets, which pellets are placed in a drying oven and heated to 125° F. for 60 minutes or until thoroughly dry.

If formamide is used instead of water, approximately 240 lbs. of formamide must be used with the above mixture and dried at 175° F. for one hour.

Experience has shown that admixtures having aluminum prepared in accordance with the above have a substantially indefinite shelf life and the expansive action of a given batch of admixture will remain the same year after year. Accordingly, it is not necesary to compensate in the field for the shelf life of the admixture and it is also possible to make larger batches of admixture with the resultant economy of large production runs and store these admixtures anywhere in the country until read for use.

The invention has been described with reference to a preferred embodiment. Obviously, modifications and alterations will occur to others upon a reading and understanding of this specification, and it is my intention to include all such modifications and alterations insofar as they come within the scope of the appended claims.

Having thus described my invention, I claim:

1. A method of preparing admixtures for use in cementitious grouts comprising the following steps: providing a mixture of aluminum flakes, said aluminum flakes being substantially free of an oxide film, a powdered extender and a water soluble organic coating agent, both said extender and said coating agent being inert to aluminum, the ratio of said coating agent to the sum of the aluminum flakes plus the powdered extender being sufficiently great to provide cohesion of the mixture so as to resist disintegration thereof during subsequent dry mixing and sufficiently small to produce a porous mixture, adding a solvent to said mixture for dissolving said coating agent, mixing such mixture and solvent into a paste, dividing said paste into granules and drying said granules.

2. A method of preparing aluminum flakes for use in an admixture for cementitious grout comprising the steps of: providing a mixture of aluminum in the form of flakes and a powdered extender, said aluminum flakes being substantially free of an oxide film, mixing said flakes with a water soluble organic coating agent selected from the class consisting of methyl cellulose, carboxymethyl cellulose, polymers of ethylene oxide and hydroxyethyl cellulose, the ratio of said coating agent to the sum of aluminum particles plus the powdered extender being sufficiently great to provide cohesion of the mixture so as to resist disintegration thereof during subsequent dry mixing and sufficiently small to produce a porous mixture, adding a solvent to said mixture for dissolving said coating agent, mixing such mixture and solvent to produce a paste, and, thereafter, drying said paste and breaking said dry paste into small particles.

3. An article of manufacture for use in admixtures for cementitious materials consisting essentially of an intimate mixture of finely divided aluminum flakes and a powdered extender and a dried water soluble organic coating material, said aluminum flakes being substantially free of an oxide film, both said extender and said coating material being inert to aluminum, the ratio of said coating material to the sum of the aluminum flakes plus the powdered extender being sufficiently great to provide cohesion of the mixture so as to resist disintegration thereof during subsequent dry mixing and sufficiently small to produce a porous mixture, said aluminum flakes and extender being dispersed throughout said coating material and said mixture being in the form of finely divided, dried particles.

4. An article of manufacture consisting essentially of an intimate mixture of aluminum flakes and a water soluble coating agent selected from the class consisting of methyl cellulose, carboxymethyl cellulose, polymers of ethylene oxide, and hydroxyethyl cellulose, said aluminum flakes being substantially free of an oxide film, the ratio of said coating agent to the sum of the aluminum flakes being sufficiently great to provide cohesion of the mixture so as to resist disintegration thereof during subsequent dry mixing and sufficiently small to produce a porous mixture, said mixture being in the dry, agglomerated state.

5. The article of manufacture of claim 4 including a powdered extender inert to aluminum.

6. The article of manufacture of claim 5 wherein said inert extender is limestone dust.

7. An article of manufacture consisting essentially of a dried, agglomerated mixture of aluminum flakes, 45 lbs., limestone dust 398 lbs., and methyl cellulose 10.8 lbs. said aluminum flakes being substantially free of an oxide film.

References Cited by the Examiner
UNITED STATES PATENTS

| | | | |
|---|---|---|---|
| 2,280,135 | 4/42 | Ward | 106—193 |
| 2,434,302 | 1/48 | Wertz | 61—35 |
| 2,530,217 | 11/50 | Bain | 106—193 |
| 2,857,289 | 10/58 | Kates | 106—290 |

TOBIAS E. LEVOW, *Primary Examiner.*

JOHN R. SPECK, *Examiner.*